United States Patent
Degrell et al.

(10) Patent No.: US 9,224,222 B2
(45) Date of Patent: Dec. 29, 2015

(54) INTERACTIVE MULTIDIMENSIONAL DRILLDOWN ANALYSIS

(75) Inventors: Dirk Degrell, Speyer (DE); Thomas Schneider, Heidelberg (DE); Jutta Erlewein, Karlsruhe (DE)

(73) Assignee: SAP SE, Walldorf (DE)

(*) Notice: Subject to any disclaimer, the term of this patent is extended or adjusted under 35 U.S.C. 154(b) by 728 days.

(21) Appl. No.: 13/466,297

(22) Filed: May 8, 2012

(65) Prior Publication Data
US 2013/0300743 A1 Nov. 14, 2013

(51) Int. Cl.
G06T 11/20 (2006.01)

(52) U.S. Cl.
CPC .................. *G06T 11/206* (2013.01)

(58) Field of Classification Search
CPC ..... G06T 11/20; G06T 11/203; G06T 11/206; G06F 17/30587–17/30607; G06F 17/30554; G06F 17/30392–17/30398; G06F 17/30572; G06Q 10/06
USPC ................................................ 345/440, 619
See application file for complete search history.

(56) References Cited

U.S. PATENT DOCUMENTS

| | | | |
|---|---|---|---|
| 5,623,592 A * | 4/1997 | Carlson et al. ............... 715/866 |
| 5,892,507 A * | 4/1999 | Moorby et al. ............... 715/205 |
| 6,351,746 B1 * | 2/2002 | Gebauer ........................... 1/1 |
| 6,526,566 B1 * | 2/2003 | Austin ........................... 717/109 |
| 7,010,518 B1 * | 3/2006 | Bedell et al. ....................... 1/1 |
| 2004/0215626 A1 * | 10/2004 | Colossi et al. ................ 707/100 |
| 2005/0015360 A1 * | 1/2005 | Cras et al. .......................... 707/2 |
| 2005/0183017 A1 * | 8/2005 | Cain ................................ 715/719 |
| 2007/0055782 A1 * | 3/2007 | Wright et al. ................. 709/227 |
| 2007/0239499 A1 * | 10/2007 | Shukla et al. ..................... 705/7 |
| 2009/0055749 A1 * | 2/2009 | Chatterjee et al. ............ 715/738 |
| 2009/0164923 A1 * | 6/2009 | Ovi ................................. 715/764 |
| 2009/0249125 A1 * | 10/2009 | Bhatawdekar et al. ......... 714/39 |
| 2010/0023496 A1 * | 1/2010 | Mohan .............................. 707/4 |
| 2010/0058181 A1 * | 3/2010 | Ganesan et al. ............. 715/700 |
| 2011/0119627 A1 * | 5/2011 | Cho et al. ...................... 715/811 |
| 2011/0148914 A1 * | 6/2011 | Kim et al. ..................... 345/619 |
| 2011/0202469 A1 * | 8/2011 | Venkateswaran et al. .... 705/301 |

* cited by examiner

*Primary Examiner* — Charles Tseng
*Assistant Examiner* — Michael J Cobb
(74) *Attorney, Agent, or Firm* — Kenyon & Kenyon LLP

(57) ABSTRACT

Analytical functions to be applied to business intelligence data may be sequentially selected from a set of chips, each corresponding to a different function. A function associated with a selected chip may be applied to the business intelligence data and the selected chip may be added to an analysis path with other selected chips in a sequential order of selection. A result, which may include at least two selectable data points, may be displayed. Once a data point selection is made, the selection may be used to limit the functions associated with subsequently displayed chips to the selected data points. The chips listed in the analysis path may be used to change prior data point selections, the changes of which may be automatically propagated to any subsequently selected chips as indicated in the analysis path.

16 Claims, 9 Drawing Sheets

Third Section 250 – Timeframe

Start Selector 251  End Selector 252

First Section 210 – Analysis Path

Map Chip 232   Add Chip 211

Second Section 230 – Result Window

INTERACTIVE MULTIDIMENSIONAL DRILLDOWN ANALYSIS

BACKGROUND

Business intelligence systems enable organizations to analyze large amounts of business data. As the sophistication of these systems increases, they are able to perform more complex data analyses. While these systems have been technically able to perform complex data analyses, the different variations and combinations of the individual components of a complex analysis had precluded the use of pre-defined analysis sequences. As a result, business intelligence system users have had to manually combine different analytical steps to perform a complex analysis.

Once the analytical steps were manually combined by the user and the complex analysis was subsequently performed, the user had to manually retrace the analytical steps to make any adjustments or modifications to one or more of the steps. Some users also had to manually propagate an adjustment or modification to one of the steps to other steps as well. Once the adjustments and/or modifications were complete, the analysis was re-performed, and the entire process was repeated if any further adjustments or modifications were necessary. Such processes are time consuming, inefficient, and burdensome to business intelligence users. There is a need for a data analysis framework that is able to support complex data analyses while enabling user to quickly modify their analyses without having to manually retrace the analytical steps or propagate their modifications.

DETAILED DESCRIPTION

Figure 1:
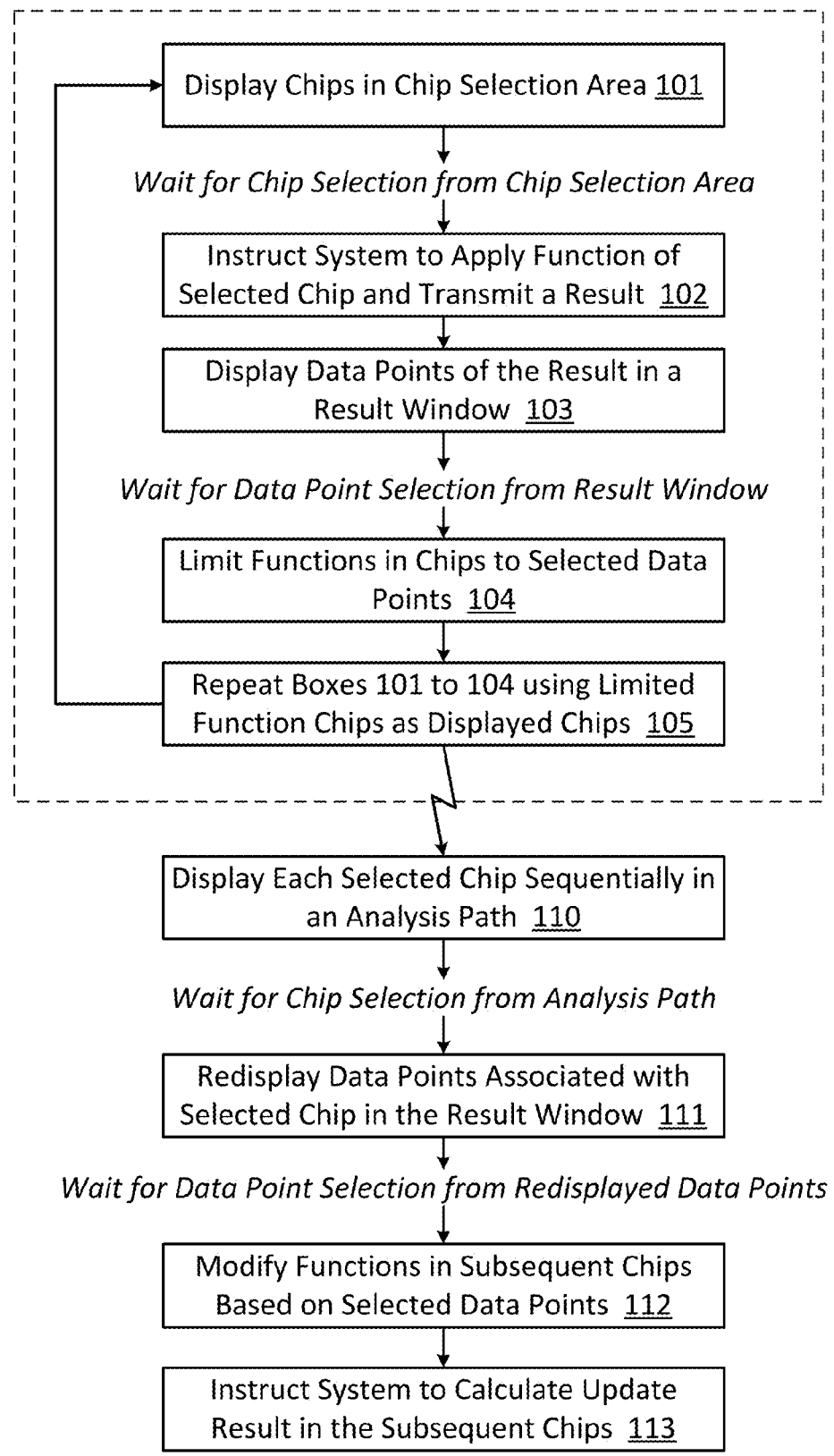
FIG. 1 shows an exemplary process for analyzing business intelligence data.

Business intelligence data may be analyzed in an embodiment by sequentially selecting analytical functions to be applied to the business intelligence data. The analytical functions may be selected from a set of chips displayed in a chip selection area. Each chip may be displayed in a form of a selectable object and may correspond to a different function to be applied to the business intelligence data. The selectable object may be, but is not limited to, a selectable image, icon, hyperlink, text, or any other type of selectable object.

Once a user selects a first chip from the set of chips, the function associated with the selected chip may be applied to the business intelligence data. The selected chip may also be added to an analysis path, which may display the selected chip along with other selected chips in a linear sequence corresponding to a sequential order in which the chips were selected. A result of applying the function associated with the selected chip may then be outputted for display in a result window.

Each result outputted for display to the user in the result window may include one or more selectable data points. For example, if the outputted result includes a line chart or graph that displays information as a set of data points connected by lines, then the selectable data points may include one or more of the data points connected by the lines, one or more of the lines, or one or more of the line segments between the data points. As another example, If the output result include a list of items, then the selectable data points may include one or more items in the outputted list.

A selection of one or more of these selectable data points from the result displayed in the result window may then be made. Once the selection is made, all subsequent analysis functions applied to the business intelligence data may be limited to only those selected data points. To limit subsequent functions, each of the functions associated with a respective chip in the set of chips may be modified to limit the analysis and/or a result of the analysis of the function to the data point selection. Thereafter, the set of chips with the modified functions may be represented to the user for selection and the process may be repeated by applying the modified function to the business intelligence data. Each time the process is repeated, the selected modified chip may be added to the analysis path in its sequential order of selection and the functions in subsequent selected chip may be further modified based on the data points selected from the result of applying the selected modified chip function to the business intelligence data.

This may repeat until a desired final result is obtained, at which the desired final result may be outputted as a final result of the process. The selected chips presented in the analysis path also may be used to recall and/or modify data points selected from the results of applying the function in a previously selected chip. If the selected of the recalled data points from a previously selected chip is changed, the changes may be implemented at each of the subsequently selected chips. The changes may be implemented by modifying the functions associated with each of the subsequently selected chips in the analysis path based on the new data point selection.

FIG. 1 shows an exemplary process for analyzing business intelligence data. In some instances the exemplary process may be stored as a set of instructions in a computer readable medium that when executed by a processing device, cause the processing device to execute the process. In box 101, two or more chips may be displayed in a chip selection area of a user interface. Each of the chips may represent a function to be applied to the business intelligence data. The function may include any type of function including, but not limited to, a mathematical function, a logical function, a statistical function, a grouping function, and a data analysis function.

In some instances, the process may wait until a chip is selected from those displayed in the chip selection area. In box 102, once a chip selection has been made from the chip selection area, an instruction may be generated and/or transmitted to a data analysis system that analyzes business intelligence data. The instruction may direct the data analysis system to apply the function associated with the selected chip to the business intelligence data and transmit a result. The result may include two or more data points.

Once the result is received from the data analysis system, in box 103, the result and/or the two or more data points received from the data analysis system may be displayed in a result window of the user interface. The two or more data points that are displayed in the result window of the user interface may be designated as selectable in the result window.

In some instances, the process may wait until at least one of the data points is selected from the result window. In box 104, once the data point selection has been made from the result window, the functions in at least some of the plurality of chips may be modified by limiting the respective functions to data associated with the data point selection. In some instances, the data point selection may include a selection of one data point and/or more than one data point.

In box 105, the steps in boxes 101 to 104 may be repeated one or more times. During each repetition of these steps, the chips that are displayed in the chip selection area in box 101 may include those chips having modified functions in box 104. Once a chip having a modified function selected is from those displayed in box 101, the instruction in box 102 may direct the data analysis system to apply the modified function to the business intelligence data, the results of which may be displayed in box 103. Each time the steps in boxes 101 to 104 are repeated, any modifications to the functions that are made may be cumulative to any previous modifications. In this regard, each modification to the functions may further limit the respective functions to each additional data point selection in each repetition in addition to any earlier data point selections.

In box 110, each chip selected from the displayed chips in the chip selection area of box 101 may be displayed in an analysis path in a sequential order of selection from the chip selection area of box 101. Thus, if the steps in boxes 101 to 104 are repeated five times, with one of the chips selected each time, the analysis path may show each of the five selected chips in the order that they were selected from the chip selection area in box 101.

The steps in boxes 110 to 113 may occur independently from those in boxes 101 to 105 and need not occur linearly or sequentially to the steps in boxes 101 to 105. For example, the step in box 110 of displaying each chip selected from the chip selection of box 101 in the analysis path may occur immediately after a chip displayed in the chip selection area of box 101 is selected, every time that such a chip selection occurs. In some instances, the step in box 110 may occur after the data points of the result are displayed in the result window in box 103. In other instances, the step in box 110 may occur after a data point selection is made from the data points displayed in the result window in box 103. The steps in boxes 110 to 113 may be performed in parallel to and/or in between the steps in boxes 101 to 105. In addition, the steps in box 111 to 113 may be performed in parallel to and/or independent of the step in box 110.

Once two or more selected chips are displayed in the analysis path, a user may use the analysis path to navigate back and/or revisit a previously selected chip. One or more of the chips displayed in the analysis path may also be deleted or rearranged. In some instances, chips may be rearranged by dragging them to a different position in the analysis path. Thus, dragging the third chip to the start of the analysis path may cause the third chip to be moved to the first chip position. The functions associated with each chip may be applied to the business intelligence data based on the chip order in the analysis. As a result, if the order of the chips in the analysis path changes, the functions associated with each chip may be applied in a different order, which may cause an output change. Similarly, if a chip is deleted, the function associated with that chip may no longer be applied to the business intelligence data, which may also cause an output change. In box 111, once a user has selected a particular chip in the analysis path, the results and/or data points associated with the selected chip in the analysis path may be accessed and then redisplayed in the result window.

Once the data points have been redisplayed in the result window, a new data point selection may be made from those redisplayed in the result window. Once a new data point selection is made, in box 112, each of the functions associated with each of the chips in the analysis path following the selected chip in the analysis path may be modified. The function modification in box 112 may re-limit each respective function to data associated with the new data point selection from the redisplayed points in box 111 instead of any prior point selection from the data points displayed in box 103.

In box 113, an instruction may be generated and/or transmitted to a data analysis system that analyzes business intelligence data. The instruction may direct the data analysis system to calculate an updated result in each of the chips in the analysis path following the selected chip. A final or desired updated result may then be outputted as an end result. The configuration of chips in the analysis path may also be saved and recalled at a later time. The saved chip configuration data may include an identifier of each chip selected for inclusion in the analysis path, an identifier of an order of each selected chip in the analysis path, and/or an identifier of any selected filters, data points, options, functions, or other data associated with the chips that is to be later recalled.

Figure 2:
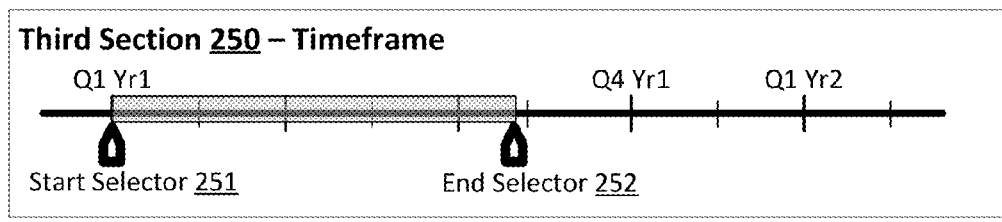
FIG. 2 shows an exemplary user interface.
Figure 2:
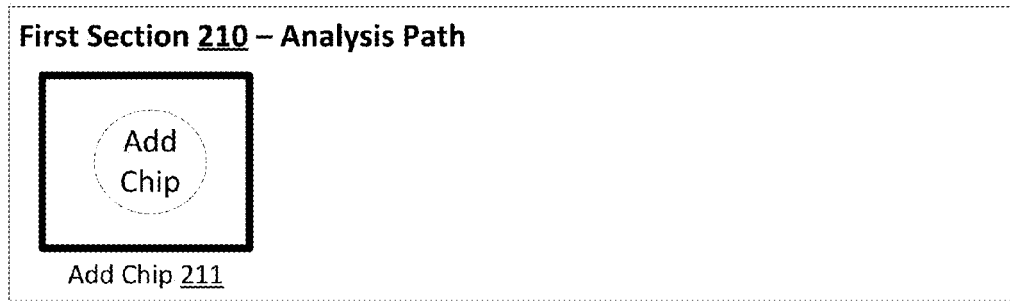
Figure 2:
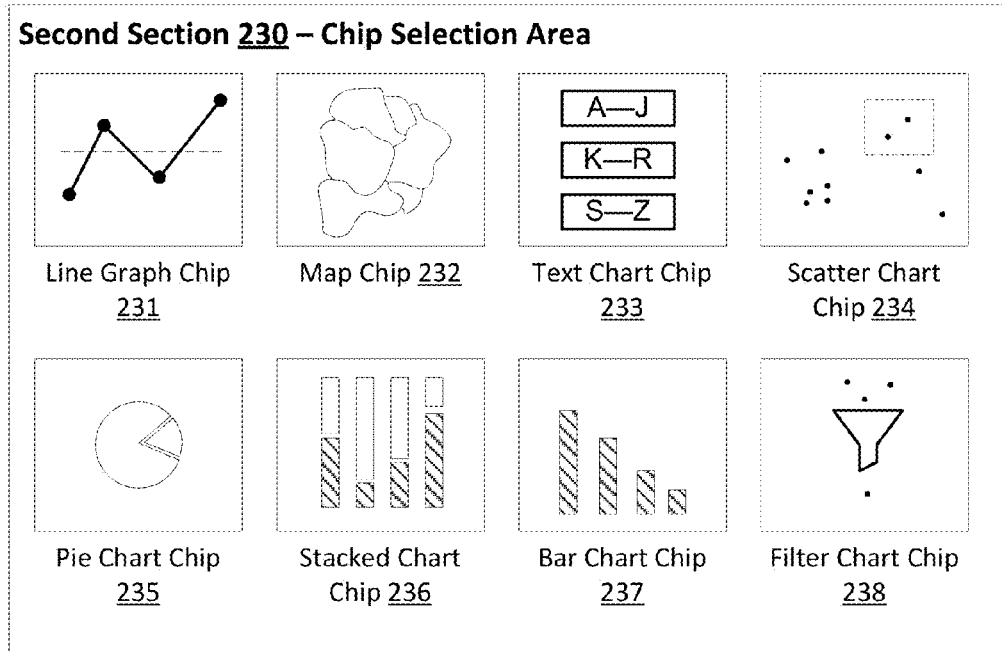

FIG. 2 shows an exemplary user interface. The user interface in this example is divided into three sections, a first section 210, a second section 230, and a third section 250. The user interface may be divided differently in other embodiments and need not include the section shown. The first section 210 shows an exemplary analysis path. The analysis path may display chips selected from the chip selection area, which is shown in the second section 230, in a sequential order of selection from the chip selection area.

The analysis path may include an arrangement 211 for adding a chip to the analysis path. In this example, the arrangement 211 is a selected add chip image. Upon selecting or activating the add chip image arrangement 211, the chip selection area and/or chips in the chip selection area may be displayed in the second section 230 of the user interface.

In this example, the chips in the chip selection area include a line graph chip 231, a map chip 232, a text chart chip 233, a scatter chart chip 234, a pie chart chip 235, a stacked chart chip 236, a bar chart chip 237, and a filter chart chip 238. Each of the chips 231 to 238 may have a functions associated with the respective chip that is capable of analyzing the business intelligence data and generating a result, including at least two data points, in the respective format.

Thus, the line graph chip 231 may be associated with a function for analyzing the business intelligence data, plotting data points, and generating a line graph as a result. The map chip 232 may be associated with a function for analyzing business intelligence data based on geography and displaying the results in a map format with regional data points. The text chart chip 233 may be associated with a function for subdividing or categorizing business intelligence data into selectable groups. Each of the other chips 234 to 238 may be associated with respective functions capable of analyzing the business intelligence data and generating corresponding results.

In some instances, one or more of the chips shown in the chip selection area and/or analysis path may include a pictorial representation of a function associated with the chip. Thus, the line graph chip 231 may show a line graph, the map chip 232 may show a map, the text chart chip 233 may show a text chart, and so on. The pictorial representation may include an exemplary or actual graphical output format of a result of applying the function associated with the chip. In some instances the pictorial representation may be updated to depict an updated result or an updated data selection from a result.

The third section 250 may include additional filtering criteria that apply universally to all analysis of business intelligence data. In this example, the third section 250 includes a time frame including a timeline with a moveable visual indicator 251 and 252 for adjusting each of the selectable start date 251 and the selectable end date 252 to identify the particular dates of interest. The business intelligence data that is subsequently analyzed may be limited to the set of data with the selected date range.

Figure 3:
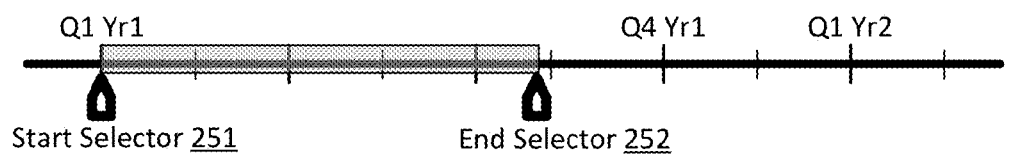
FIG. 3 shows an exemplary subsequent user interface to that shown in FIG. 2.
Figure 3:
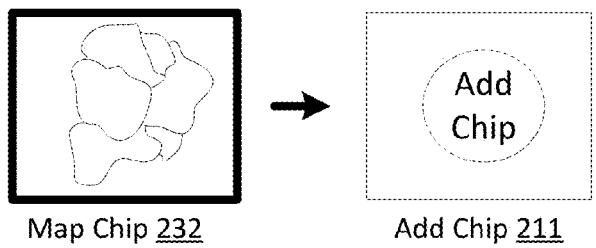
Figure 3:
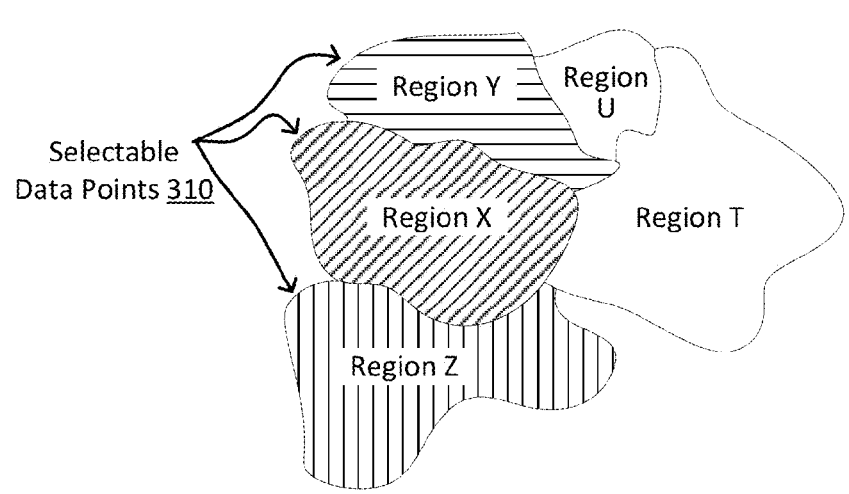

FIG. 3 shows an exemplary subsequent user interface to that shown in FIG. 2 when the map chip 232 in FIG. 2 is selected from the chip selection area in the second section 230. Once the map chip 232 is selected, an instruction may be sent to the data analysis system to apply the function associated with the map chip 232 to the business intelligence data (which in this case is limited to the data in the data range between the start selector 251 and end selector 252). The second section 230 of the interface may then be transitioned from the chip selection area to a result window showing the data points and/or result of applying the function to the business intelligence data. Additionally, the selected map chip 232 may be added to the analysis path in the first section 210. Since the map chip 232 is the first selected chip in this example, it may appear first in the analysis path.

In this case, the function associated with the map chip 232 may be function for calculating an average days sales outstanding (DSO) for regions T to Z which is then displayed in a regional map. In other instances, the function associated with a map chip may vary. In this example, the average DSO for region X may be between 30 and 60 days, region Y may be between 0 and 30 days, and region Z may be between 60 and 90 days. Regions T and U may have insufficient data. Hatch marks may be used to depict the calculated result in the map and also to identify the selectable data points 310. In this example, regions X, Y, and Z may each be selectable 310 in the map. In some instances, item appearing in the legend, such as the horizontal hatch marks for days 0 to 30, angled hatch marks for days 30 to 60, and vertical hatch marks for days 60 to 90 may also be selectable to quickly select all of the regions in the map satisfying the selected items. Regions T and U, which have insufficient data, need not be selectable.

Each of the selectable data points 310 may be displayed in a pictorial format and change appearance upon selection to visually indicate to the user which data points have actually been selected and which have not. The pictorial format may include, but is not limited to, a graphical format, a map format, and a chart format.

Figure 4:
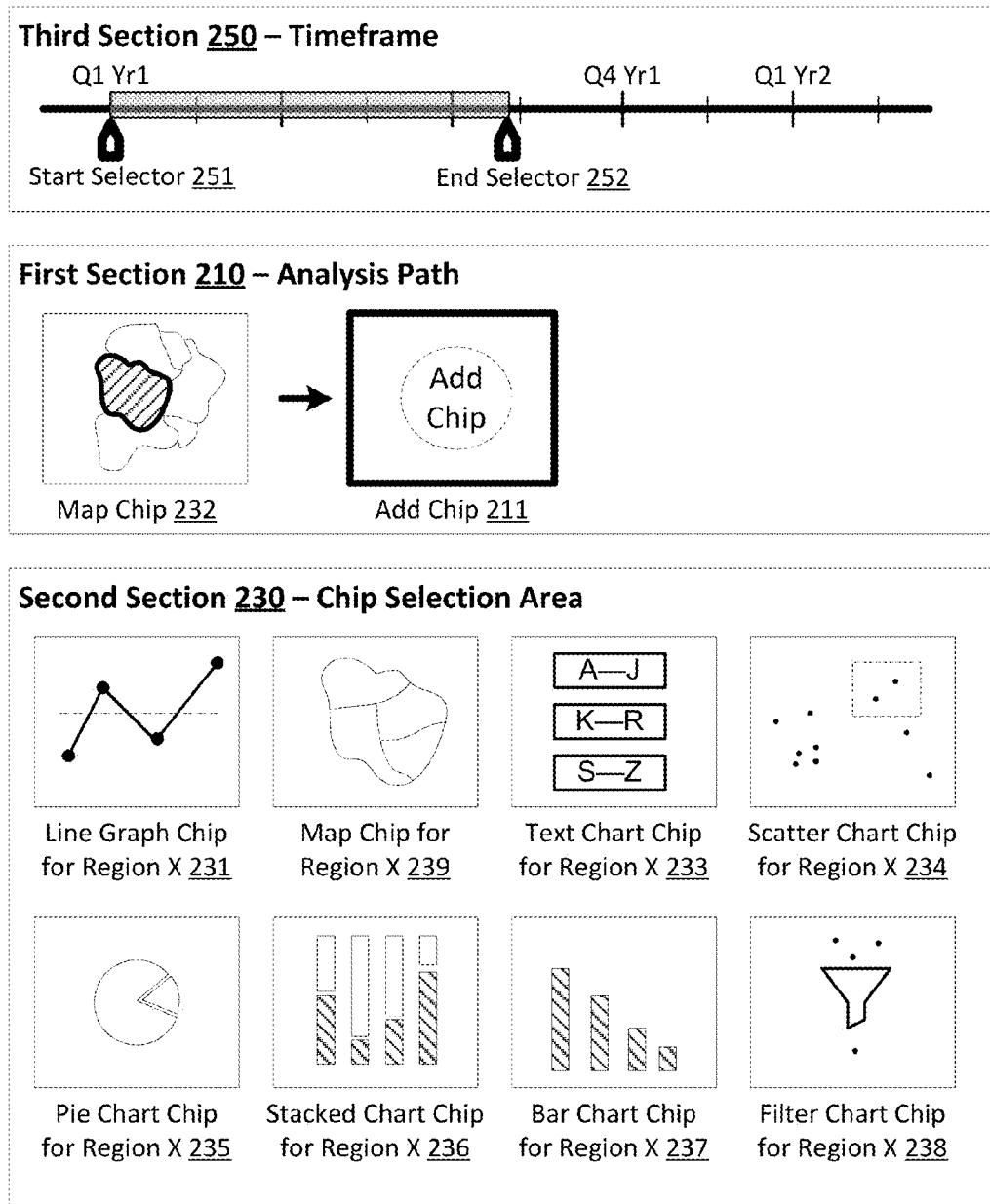
FIG. 4 shows an exemplary subsequent user interface to that shown in FIG. 3.

FIG. 4 shows an exemplary subsequent user interface to that shown in FIG. 3 when Region X is selected from the result window in the second section 230 and the add chip arrangement 211 is activated. Once Region X is selected, each of the functions associated with the chips in the chip selection area may be modified to further limit the functions to data within the selected region X. The result window in the second section 230 may be replaced with the chip selection window. Each of the chips 231 and 233 to 239 displayed in the chip selection window may be updated to cause the respective modified function to be applied the business intelligence data. Thus, selecting the line graph chip 231 may limit the application of the associated line graph plotting function to business intelligence data in Region X. Selecting the map chip 239 may also limit the application of the associated map function to data in region X. Thus, if map chip 239 is now selected, the function may be applied to and the results may show data for only those sub-areas within region X. The functions associated with each of the other chips 233 to 238 may also be similarly modified to limit data to Region X.

Additionally, in some instances as discussed previously, the pictorial representations of a chip may be updated as changes occur. Thus, as shown in FIG. 4, after region X is selected in the result window, the pictorial representation of map chip 232 displayed in the analysis path may be updated to show the selection of Region X and/or a result displayed in the result window. One or more of the pictorial chip representations displayed in the chip selection area of FIG. 4 may also be updated based on the selection of Region X in the result window. For example, as shown in FIG. 4, map chip 239 in the chip selection area may be updated to show the sub-areas within Region X.

Figure 5:
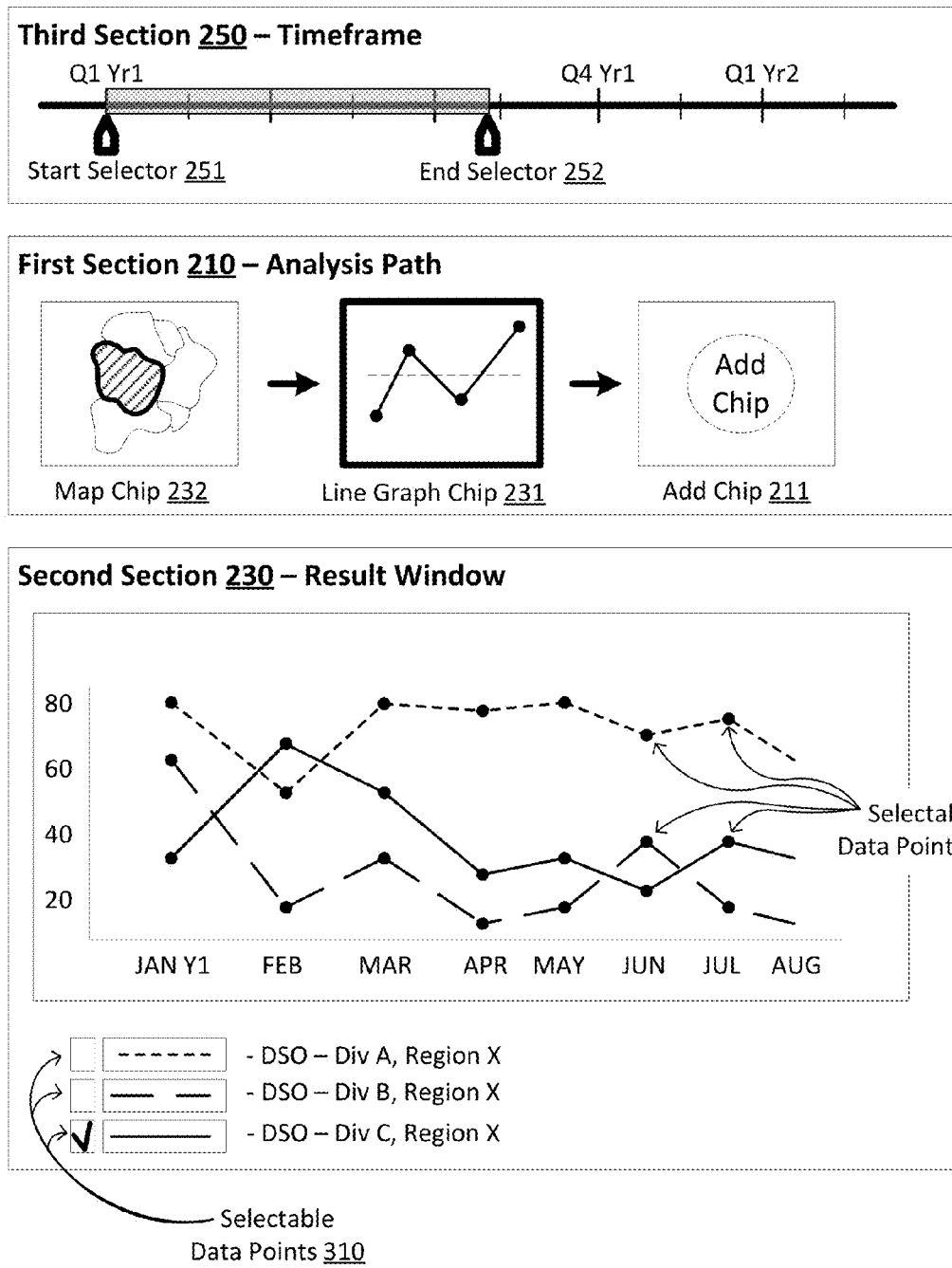
FIG. 5 shows an exemplary subsequent user interface to that shown in FIG. 4.

FIG. 5 shows an exemplary subsequent user interface to that shown in FIG. 4 when the line graph chip 231 in FIG. 4 is selected from the chip selection area in the second section 230. Once the line graph chip 231 is selected, an instruction may be sent to the data analysis system to apply the function associated with the line graph chip 231 to the business intelligence data (which in this case is limited to both the data in the data range between the start selector 251 and end selector 252 and the data in region X based on the previously selection of the data point 310 associated with Region X in FIG. 3). The second section 230 of the interface may then be transitioned from the chip selection area to a result window showing the data points and/or line graph result of applying the function to the business intelligence data in Region X. Additionally, the selected line graph chip 231 may be added to the analysis path in the first section 210. Since the line graph chip 231 is selected after the map chip 232, the line graph chip 231 may appear next to the map chip 323 in the analysis path.

In this case, the function associated with the line graph chip 231 may be function for calculating an average days sales outstanding (DSO) on a monthly basis for each division, that was also modified to limit the results to divisions within Region X, after the selection of Region X from the result window in FIG. 3. The results for the three Divisions A, B, and C, are shown in the result window in the second section 230 of FIG. 5. The plotted monthly data points for each of the three Divisions A, B, and C within Region X may be independently selectable data points 310. Additionally, all of the data points associated with one or more of the Divisions A, B, C, may also be selectable 310 from the legend shown below the graph (in FIG. 5, Division C is shown as selected with the check mark).

Figure 6:
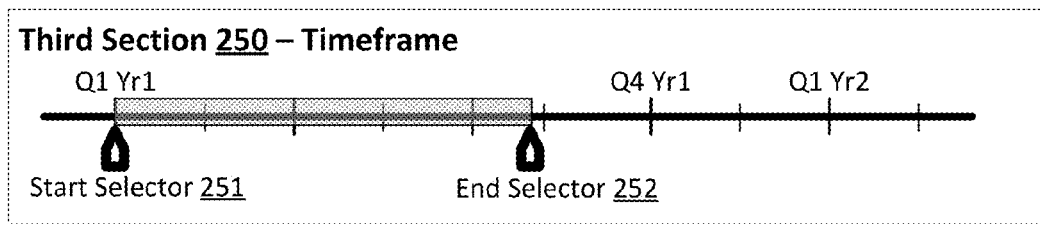
FIG. 6 shows an exemplary subsequent user interface to that shown in FIG. 5.
Figure 6:
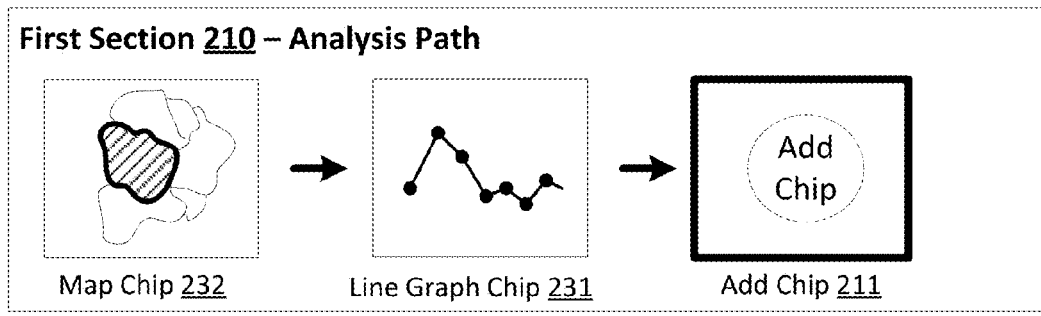
Figure 6:
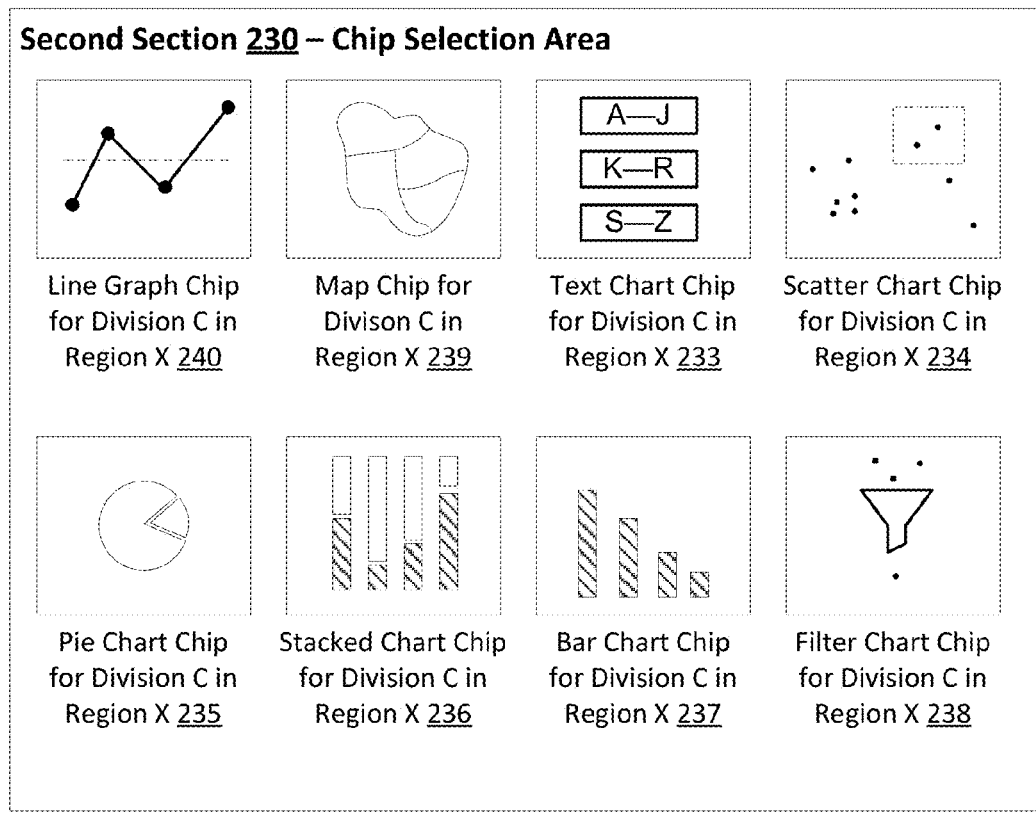

FIG. 6 shows an exemplary subsequent user interface to that shown in FIG. 5 when all of the displayed data points associated with Division C are selected from the result window in the second section 230 and the add chip arrangement 211 is activated. Once the Division C data points are selected, each of the functions associated with the chips 233 to 240 in the chip selection area may be modified to further limit the functions to data within Division C, in addition to the prior modification limiting the functions to data within Region X. The result window in the second section 230 may be replaced with the chip selection window. Each of the chips 233 to 240 displayed in the chip selection window may be updated to cause the respective modified function to be applied the business intelligence data once a respective chip is selected. Thus, selecting the scatter chart chip 234 may further limit the application of the associated scatter chart plotting function to business intelligence data in both Division C and Region X. The functions associated with each of the other chips 233 and 235 to 240 may also be modified to limit the function to data in both Division C and Region X.

Additionally, in some instances as discussed previously, the pictorial representations of a chip may be updated as changes occur. Thus, as shown in FIG. 6, after Division C is selected in the result window of FIG. 5, the pictorial representation of line graph chip 231 displayed in the analysis path may be updated to show the selection of Division C and/or the data points associated with Division C. One or more of the pictorial chip representations displayed in the chip selection area of FIG. 4 may also be updated based on the selection of Division C in the result window.

Figure 7:
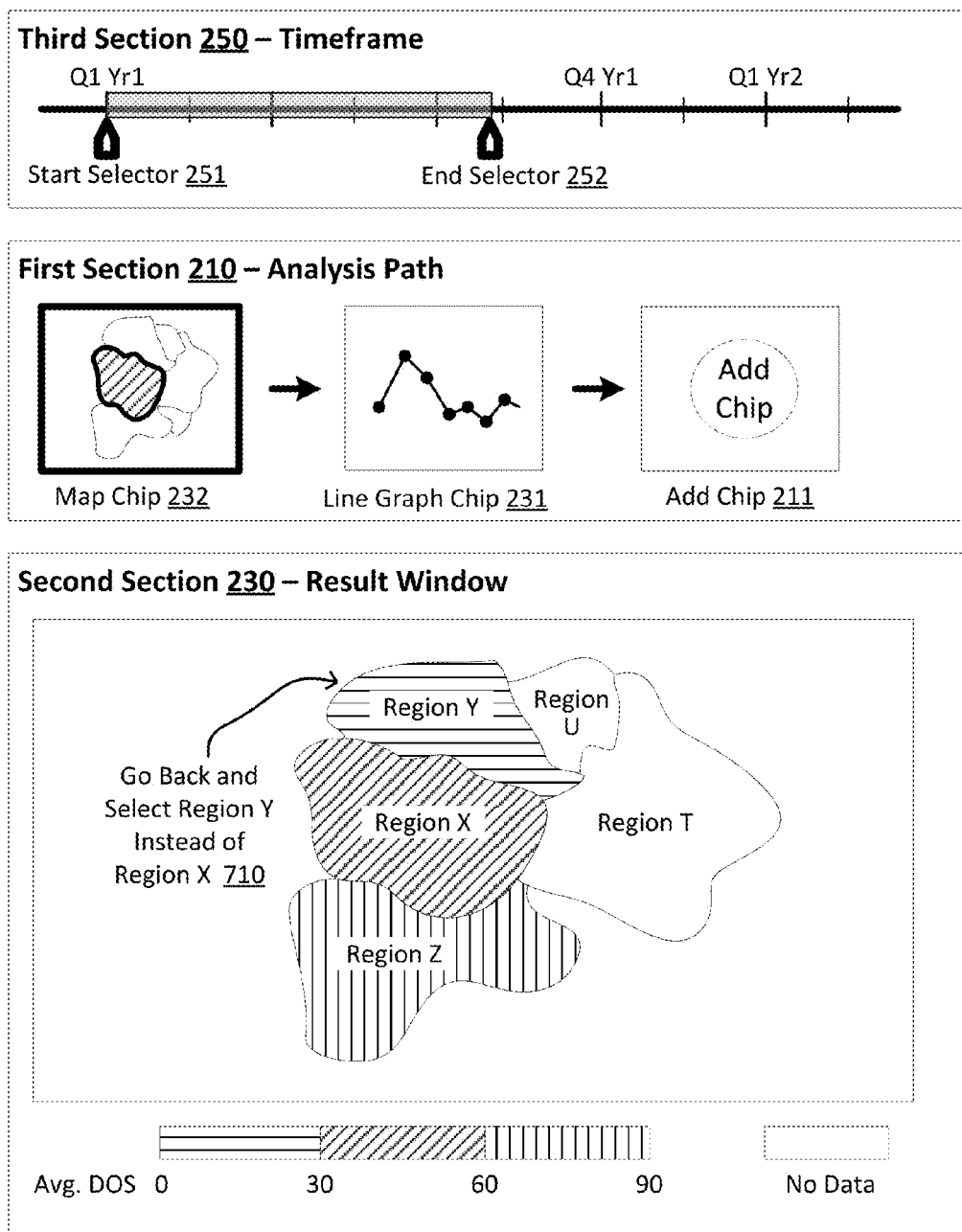
FIG. 7 shows an exemplary subsequent user interface to that shown in FIG. 6.

FIG. 7 shows an exemplary subsequent user interface to that shown in FIG. 6 when a previous chip, in this example, the map chip 232, is selected in the analysis path of the first section 210 of the user interface. In this example, once the map chip 232 in the analysis path is selected, the result associated with the map chip 232 (as shown in result window in the second section 230 of FIG. 3) may be retrieved. The chip selection area shown in the second section 230 of the user interface in FIG. 6 may be removed from the second section 230 of the user interface and replaced with the retrieved result. Once the retrieved result is redisplayed in the second section 230 result window, another of the three selectable regions may be selected 710, which in this example is Region Y instead of Region X.

Figure 8:
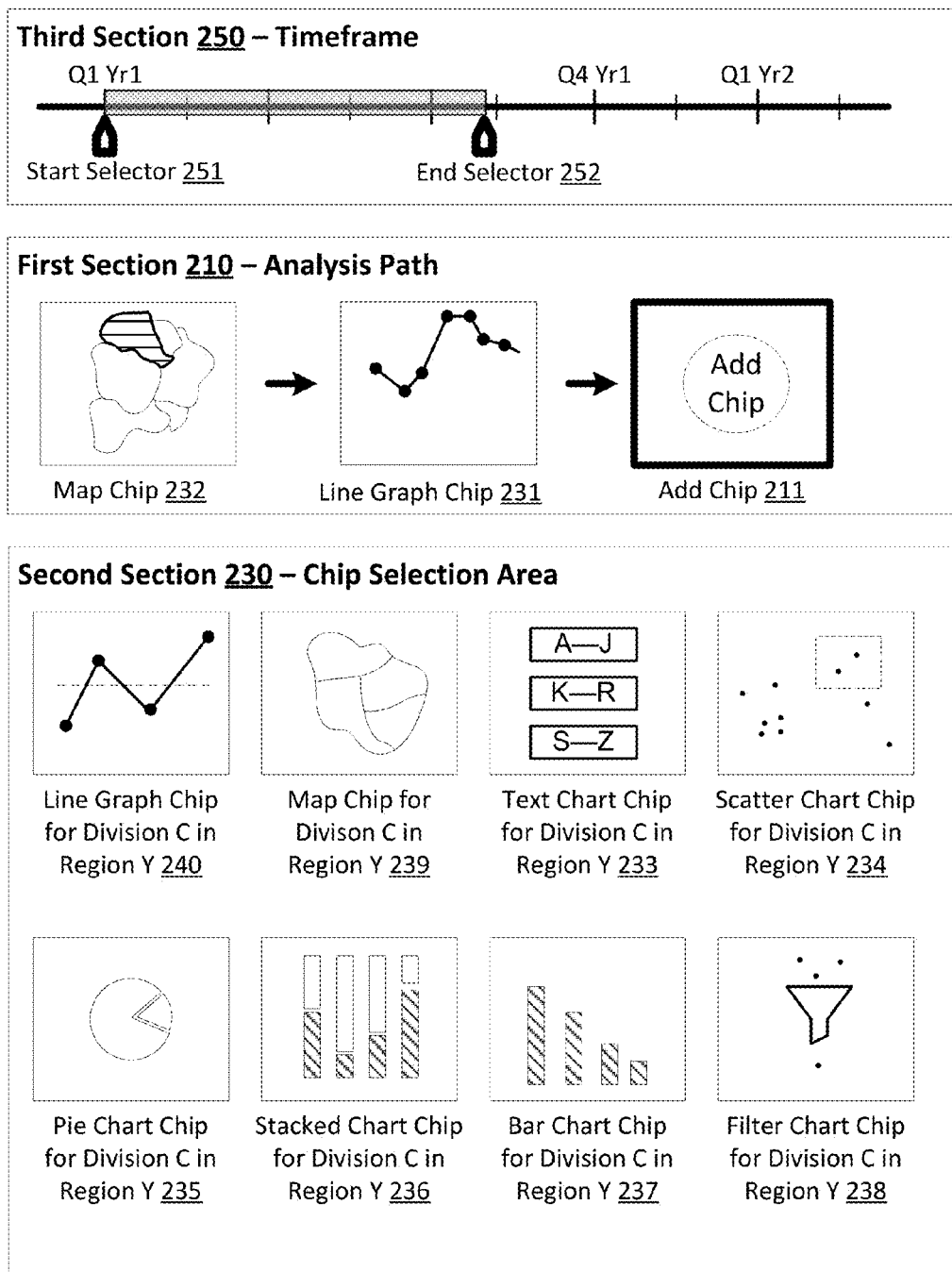
FIG. 8 shows an exemplary subsequent user interface to that shown in FIG. 7.

FIG. 8 shows an exemplary subsequent user interface to that shown in FIG. 7 when Region Y is selected 710 instead of Region X in the second section 230 result window of FIG. 7. Once Region Y is selected, the pictorial representation of the map chip 232 in analysis path in the first section 210 may be updated to show the selection of Region Y instead of Region X. Additionally, the function associated with the line graph chip 231 may also be modified to limit the application of the associated line graph plotting function to business intelligence data in Region Y instead of Region X. An instruction may be sent to the data analysis system to apply this modified function associated with the line graph chip 231 to the business intelligence data (which in this case is now limited to the data in Region Y instead of Region X).

Once the result of applying the modified function to the data in Region Y is received, the corresponding result may be updated and the pictorial representation of the line graph chip 231 in analysis path in the first section 210 may be also similarly updated. Additionally, the functions associated with any new or subsequent chips may also be updated to limit the application of the functions to the business intelligence data in Region Y instead of Region X.

Thus, if the arrangement 211 for adding an additional chip is activated, each of the chips 233 to 240 displayed in the chip selection window may also be updated to limit the application of the functions to the business intelligence data in Region Y instead of Region X without otherwise changing the respective functions. Thus, selecting the scatter chart chip 234 may further limit the application of the associated scatter chart plotting function to business intelligence data in both Region Y and Division C (since the selection of Division C in the line graph chip 231 result window as shown in FIG. 5 has not been changed). The functions associated with each of the other chips 233 and 235 to 240 may also be modified to limit the function to data in both Region Y and Division C.

Figure 9:
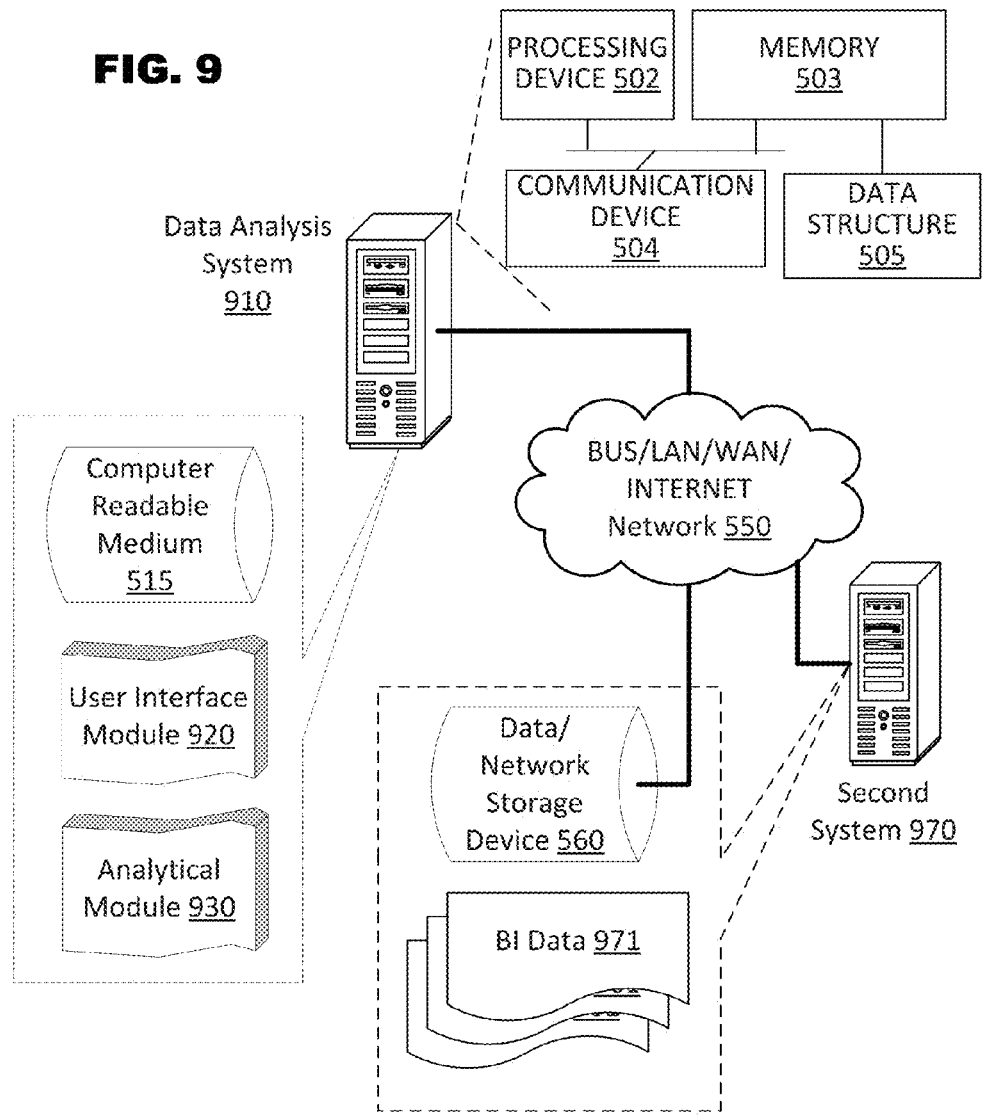
FIG. 9 shows an exemplary architecture.

FIG. 9 shows an exemplary architecture. Data analysis system 910 may include a computer readable medium 515 storing application modules that may include a user interface module 920 and/or a software component of analytical module 930. In some instances, these modules 920 and 930, and/or other modules or components of the data analysis system 910 may be stored in a memory 503 or data structure 505 that is separate from the computer readable medium 515 and/or the data analysis system 910.

The user interface module 920 may include instructions executed by processing device 502. These instructions may include instructions for displaying a plurality of chips in a chip selection area. Each chip may represent a function to be applied to business intelligence data 971 that may be stored in network storage device 560 and/or second system 970. The instructions may also include instructions for detecting a chip selection from the displayed chip selection area, displaying a plurality of data points of a result received from a second system in a result window detecting a data point selection from the displayed result in the result window, displaying in an analysis path each of the chips selected from the chip selection area in a sequential order of selection, and detecting a chip selection from the analysis path.

The analytical module 930 may include a software and/or hardware components, such as a communications device 504, that may be capable of using the communications device 504 to instruct the second system 970 over the communications network 550 to apply the function associated with the selected chip to the business intelligence data 971 and transmit the result back to the data analysis system 910 after a chip is selected from the chip selection area.

The analytical module 930 may also be capable of modifying the functions in at least some of the plurality of chips by limiting the respective functions to one or more selected data points after the one or more data points have been selected from a displayed result.

The analytical module 930 may also be capable of triggering a redisplay of the data points of a result associated with a selected chip from the analysis path in the result window after a chip selection in the analysis path is detected.

The analytical module 930 may also be capable of modifying each of the functions in each of the chips in the analysis path following a selected chip according to the data point selection from the triggered redisplay of data points and then instructing the second system 970 to calculate an update result in each of the chips in the analysis path following the selected chip after one or more data points are selected from the triggered redisplay of data points.

Data analysis system 910 may be connected to a network 550. Network 550 may include a LAN, WAN, bus, or the Internet. Data analysis system 910 may interface with other systems and components depending on the application. For example, a network/data storage device 560 may be used to store the different types of data structures, including business intelligence data 971. The storage device 560 may be a part of a second system 970.

In some embodiments the network storage device 560 may also be separate from the business management system 370 but connected to it through network 550. The storage device 560 may contain a hard disk drive, flash memory, or other computer readable media capable of storing data. Other external systems and data sources may also be connected to network 550. These other systems may be used to supply additional data or information used by the data analysis system 910 or the second system 970, such as, for example, financial, customer, or other organizational data.

Each of the systems, clients, and devices in FIG. 9 may contain a processing device 502, memory 503 storing loaded data or a loaded data structure 505, and a communications device 504, all of which may be interconnected via a system bus. In various embodiments, each of the systems 910 and 970 may have an architecture with modular hardware and/or software systems that include additional and/or different systems communicating through one or more networks. The modular design may enable a business to add, exchange, and upgrade systems, including using systems from different vendors in some embodiments. Because of the highly customized nature of these systems, different embodiments may have different types, quantities, and configurations of systems depending on the environment and organizational demands.

Communications device 504 may enable connectivity between the processing devices 502 in each of the systems 910 and 970 and the network 550 by encoding data to be sent from the processing device 502 to another system over the network 550 and decoding data received from another system over the network 550 for the processing device 502.

In an embodiment, memory 503 may contain different components for retrieving, presenting, changing, and saving data and may include the computer readable medium 515. Memory 503 may include a variety of memory devices, for example, Dynamic Random Access Memory (DRAM), Static RAM (SRAM), flash memory, cache memory, and other memory devices. Additionally, for example, memory 503 and processing device(s) 502 may be distributed across several different computers that collectively comprise a system.

Processing device 502 may perform computation and control functions of a system and comprises a suitable central processing unit (CPU). Processing device 502 may include a single integrated circuit, such as a microprocessing device, or may include any suitable number of integrated circuit devices and/or circuit boards working in cooperation to accomplish the functions of a processing device. Processing device 502 may execute computer programs, such as object-oriented computer programs, within memory 503.

The foregoing description has been presented for purposes of illustration and description. It is not exhaustive and does not limit embodiments of the invention to the precise forms disclosed. Modifications and variations are possible in light of the above teachings or may be acquired from the practicing embodiments consistent with the invention. For example, although the data analysis system 910 is shown as a separate system from the second system 970, in some instances the data analysis system 910 and the second system 970 may be functionally integrated into a single system.

We claim:

1. A method for analyzing business intelligence data comprising the following steps:
   a. displaying a plurality of chips in a chip selection area, each representing a function to be applied to the business intelligence data;
   b. responsive to a chip selection from the chip selection area, instructing a system to apply the function associated with the selected chip to the business intelligence data and transmit a result;
   c. displaying a plurality of data points of the result received from the system in a result window;
   d. responsive to a data point selection from the displayed result, modifying the functions in at least some of the plurality of chips by limiting the respective functions to the data point selection;
   e. responsive to at least one of a chip selection from the chip selection area and a data point selection from the displayed result, repeating steps a to d using those chips having modified functions as the displayed plurality of chips;
   f. displaying, in an analysis path, each of the chips selected from the chip selection area in a sequential order of selection;
   g. responsive to a chip selection from the analysis path, redisplaying the plurality of data points of the result associated with the selected chip from the analysis path in the result window;
   h. responsive to a data point selection from the redisplayed data points, modifying each of the functions in each of the chips in the analysis path following the selected chip according to the data point selection from the redisplayed data points and then instructing the system to calculate an updated result in each of the chips in the analysis path following the selected chip, wherein the analysis path includes an arrangement of adding a chip to the analysis path and the chips in the chip selection area are displayed in response to an activation of the arrangement; and
   i. subdividing a user interface screen into at least a first section and a second section, wherein the first section displays the analysis path and the second section displays the chip selection area in response to the activation of the chip adding arrangement, and then replaces the chip selection area with the result window after a chip is selected from the chip selection area.

2. The method of claim 1, wherein the repeating of the above steps includes more than one repetition and the modifying of the functions in each repetition consists of further limiting the respective functions to each additional data point selection.

3. The method of claim 1, wherein the data point selection includes a selection of one data point.

4. The method of claim 1, wherein the data point selection includes a selection of more than one data point.

5. The method of claim 1, wherein at least some chips include a pictorial representation of the function associated each chip.

6. The method of claim 5, wherein the pictorial representation includes an exemplary graphical output format.

7. The method of claim 5, wherein the pictorial representation of a respective chip is displayed in the analysis path and depicts a result of applying the function associated with the respective chip.

8. The method of claim 7, wherein the pictorial representation of the respective chip is updated to depict a data point selection from the depicted result.

9. The method of claim 1, further comprising:
   subdividing into at least the first section, the second section, and a third section displaying a timeframe including a selectable start date and a selectable end date; and
   limiting the business intelligence data to data between the selectable start date and the selectable end date selected in the timeframe.

10. The method of claim 9, wherein the displayed timeframe includes a timeline having a moveable visual indicator for adjusting each of the selectable start date and the selectable end date.

11. The method of claim 1, wherein the data points of at least one result are displayed in the result window in a pictorial format including a visual indication of selectable data points.

12. The method of claim 11, wherein the pictorial format is at least one of a graphical format, a map format, and a chart format, and a visual representation of a selectable data point changes in response to a selection of the selectable data point.

13. A non-transitory computer readable medium comprising stored instructions that, when executed by a processing device, cause the processing device to:

a. display a plurality of chips in a chip selection area, each representing a function to be applied to the business intelligence data;
b. responsive to a chip selection from the chip selection area, instruct a system to apply the function associated with the selected chip to the business intelligence data and transmit a result;
c. responsive to a chip selection from the chip selection area, display a plurality of data points of the result received from the system in a result window;
d. responsive to a data point selection from the displayed result, modify the functions in at least some of the plurality of chips by limiting the respective functions to the data point selection;
e. responsive to at least one of a chip selection from the chip selection area and a data point selection from the displayed result, repeat steps a to d using those chips having modified functions as the displayed plurality of chips;
f. display, in an analysis path, each of the chips selected from the chip selection area in a sequential order of selection;
g. responsive to a chip selection from the analysis path, redisplay the plurality of data points of the result associated with the selected chip from the analysis path in the result window; and
h. responsive to a data point selection from the redisplayed data points, modify each of the functions in each of the chips in the analysis path following the selected chip according to the data point selection from the redisplayed data points and then instruct the system to calculate an updated result in each of the chips in the analysis path following the selected chip wherein the analysis path includes an arrangement for adding a chip to the analysis path and the chips in the chip selection area are displayed in response to an activation of the arrangement and wherein the stored instructions further cause the processing device to: subdivide a user interface screen into at least a first section and a second section, wherein the first section displays the analysis path and the second section displays the chip selection area in response to the activation of the chip adding arrangement, and then replaces the chip selection area with the result window after a chip is selected from the chip selection area.

14. A system comprising:
a processing device;
a communications device coupled to a communications network;
a user interface module providing instructions executed by the processing device for:
 displaying a plurality of chips in a chip selection area, each chip representing a function to be applied to the business intelligence data;
 detecting a chip selection from the displayed chip selection area;
 displaying a plurality of data points of a result received from a second system in a result window;
 detecting a data point selection from the displayed result in the result window;
 displaying, in an analysis path, each of the chips selected from the chip selection area in a sequential order of selection; and
 detecting a chip selection from the analysis path;
an analytical module capable of:
 responsive to the detection of the chip selection from the chip selection area, instructing the second system over the communications network via the communications device to apply the function associated with the selected chip to the business intelligence data and transmit the result;
 responsive to the detection of the data point selection from the displayed result, modifying the functions in at least some of the plurality of chips by limiting the respective functions to the data point selection;
 responsive to the detection of the chip selection from the analysis path, triggering a redisplaying of the plurality of data points of the result associated with the selected chip from the analysis path in the result window; and
 responsive to a data point selection from the triggered redisplay of data points, modifying each of the functions in each of the chips in the analysis path following the selected chip according to the data point selection from the triggered redisplay of data points and then instructing the second system to calculate an update result in each of the chips in the analysis path following the selected chip, wherein the analysis path includes an arrangement for adding a chip to the analysis path and the chips in the chip selection area are displayed in response to an activation of the arrangement and
wherein the instructions further cause the processing device to: subdivide a user interface screen into at least a first section and a second section, and wherein the first section displays the analysis path and the second section displays the chip selection area in response to the activation of the chip adding arrangement, and then replaces the chip selection area with the result window after a chip is selected from the chip selection area.

15. The system of claim 14, wherein the user interface module includes instructions for displaying the data points of at least one result in a pictorial format in the result window.

16. The system of claim 15, wherein the pictorial format is at least one of a graphical format, a map format, and a chart format, and includes a visual representation of at least one selectable data point that changes in response to a selection of the at least one selectable data point.

* * * * *